United States Patent [19]

Navazo

[11] Patent Number: 5,591,938
[45] Date of Patent: Jan. 7, 1997

[54] ELECTRICAL MECHANISM SUPPORT MEMBER APPLICABLE TO A TRAY FOR ELECTRICAL CONDUCTORS

[75] Inventor: Juan M. B. Navazo, Sant Cugat Del Valles, Spain

[73] Assignee: Aparellaje Electrico, S.A., Barcelona, Spain

[21] Appl. No.: 258,713

[22] Filed: Jun. 13, 1994

[30] Foreign Application Priority Data

Jun. 14, 1993 [ES] Spain ..................................... 9301308

[51] Int. Cl.⁶ ............................. H02G 3/08; H05K 5/00
[52] U.S. Cl. .................... 174/50; 174/68.3; 174/97; 174/101; 52/220.5; 220/3.9; 361/645; 24/324; 24/662
[58] Field of Search ................... 174/48, 49, 50, 174/52.1, 58, 61, 63, 88 R, 95, 97, 101; 52/220.5, 220.7, 220.8; 220/3.3, 3.9; 361/644, 645, 657, 658, 675, 679; 24/297, 324, 662

[56] References Cited

U.S. PATENT DOCUMENTS

| | | | |
|---|---|---|---|
| 3,499,102 | 3/1970 | Gillemot et al. | 174/48 X |
| 4,887,401 | 12/1989 | Gioscia | 174/48 |
| 5,013,870 | 5/1991 | Navazo | 174/50 |
| 5,202,172 | 4/1993 | Graf | 24/297 X |

FOREIGN PATENT DOCUMENTS

| | | | |
|---|---|---|---|
| 392955 | 10/1990 | European Pat. Off. | |
| 2402957 | 4/1979 | France . | |
| 2946622 | 7/1980 | Germany . | |
| 1303433 | 1/1973 | United Kingdom | 174/68.3 X |
| 2241385 | 8/1991 | United Kingdom | 174/101 X |
| 8203505 | 10/1982 | WIPO | 174/68.3 X |

Primary Examiner—Kristine L. Kincaid
Assistant Examiner—Dean A. Reichard
Attorney, Agent, or Firm—Staas & Halsey

[57] ABSTRACT

The member or box includes: a slot under which ribs of the tray may be received and which has passages on one side and an aperture on the other side; a retaining member attached to the slot and which is provided with a fold-down tab and a tooth; fingers resiliently attached to the base portion and provided with teeth inserted through the passages and which may retain a rib; and resilient bridges extending on a higher plane above the base portion and facing the tab. The retaining member is movable between a normal inactive position and an active position in which the tooth is inserted through the aperture, retaining one of the free ends of the rib and the bridges retain the fold-down tab.

3 Claims, 4 Drawing Sheets

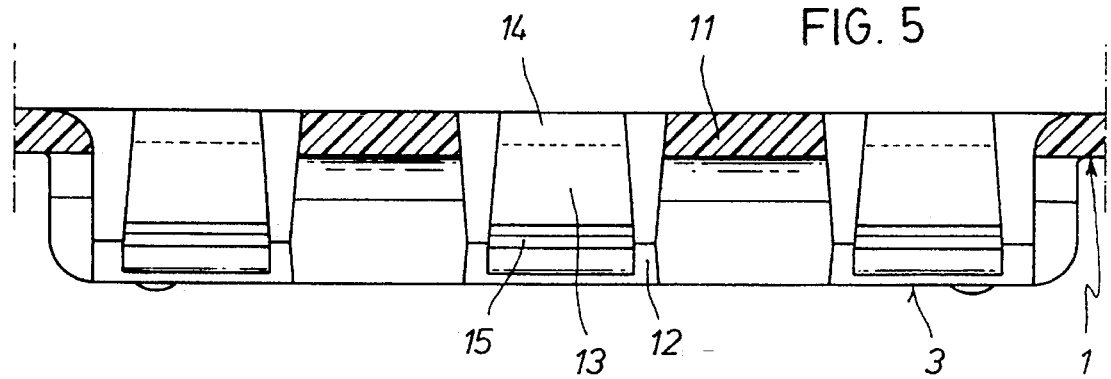
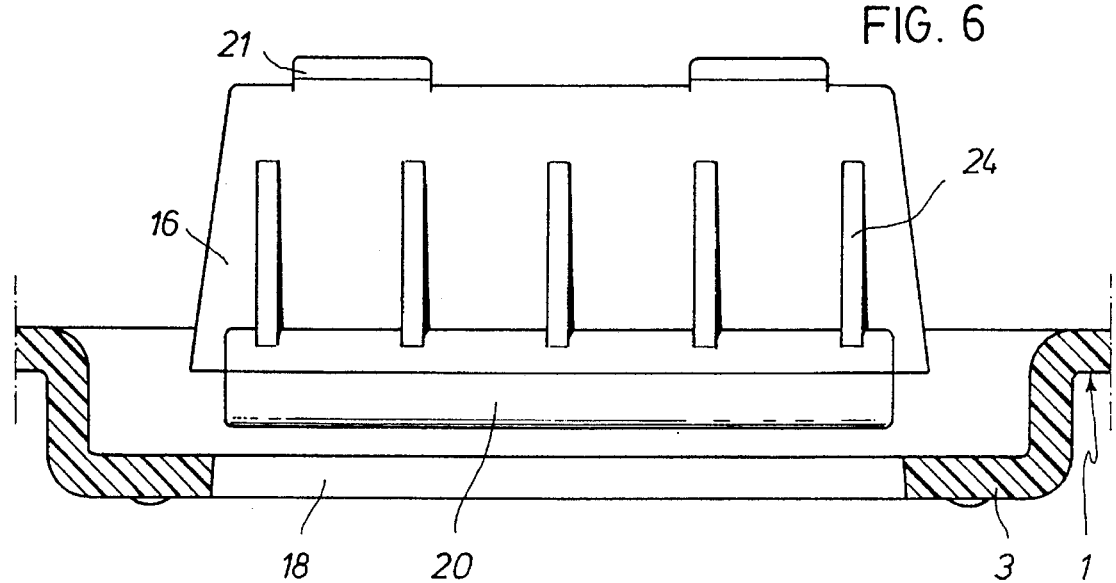
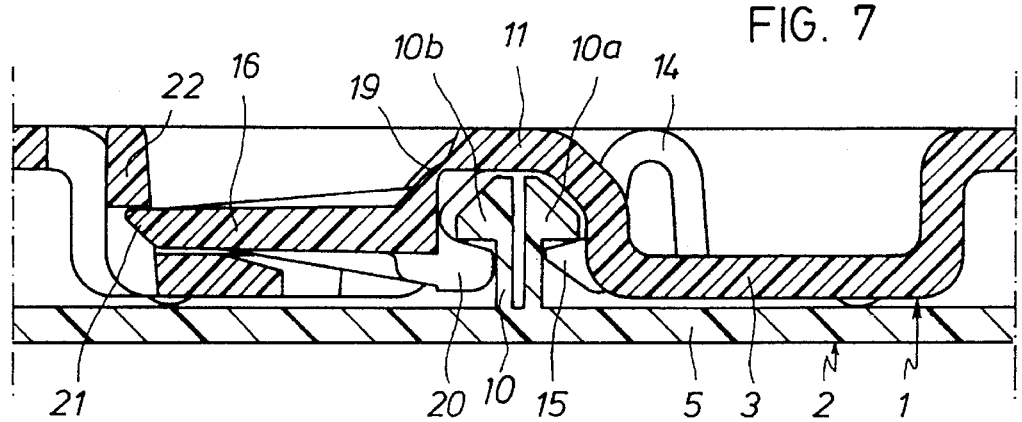

ELECTRICAL MECHANISM SUPPORT MEMBER APPLICABLE TO A TRAY FOR ELECTRICAL CONDUCTORS

FIELD OF THE INVENTION

This invention relates to an electrical mechanism support member applicable to a tray for electrical conductors, said tray having a bottom wall provided with a pair of longitudinal ribs having harpoon shaped free ends, said member having a base portion adapted to bear against said bottom wall.

The trays are regularly provided with a lid and are attached to walls or other support means. As stated above, they are adapted to house conductors and on the bottom wall thereof they are provided with one or more arrow headed longitudinal ribs.

These support members or boxes contain sundry apparatus or instruments which may be electrical, such as sockets, connectors, switches, protectors or branches, or of any other nature such as a hydraulic, mechanical, pneumatic or other items.

REFERENCE TO THE PRIOR ART

Spanish Utility Model 206,123 relates to a box for fitting in trays the bottom wall of which is provided with longitudinal T-slots, while the box is provided on the bottom thereof with mutually aligned slits through which the bent ends of a holding member for engagement in the said slots pass, and so that the edge of this member opposite said bent ends engages a resilient tongue extending from a side wall of the box. In this solution there is to be appreciated the drawback of requiring two members to be assembled.

On the other hand, Spanish Utility Model No. 223,179 discloses a box having two slots on the base thereof aligned on each side of the base center line. These slots have on either side a resilient tab. A block attached to the box by means of a thin web is inserted in the slots. In this case the necessary stability of attachment of the box to the tray is not achieved.

Also known is Spanish Utility Model No. 224,727 in which a box is provided on the bottom wall thereof with a projecting flange for removable sliding snap fitting in a support guide member located in the bottom of the tray, plus an aperture through which there is assembled a moving member having a salient angled edge bordered by another also salient member, while the other flank forms a finned prominence to be retained in said aperture, said moving member also having a rear orifice for removal by leverage. This embodiment has the drawback that the moving member is hard to operate from outside the box.

French patent No. 7825732 discloses a box having in the bottom thereof a slot mating with a T-shaped guide rail in the bottom of a tray. The bottom of the box is provided with a fold-down metal plate having an elbow which is inserted through the slot and engaged in the groove of the box, said plate being retained below a tongue extending from a wall of the box. Furthermore, the metal plate is provided with a protective insulation formed by a resilient sheet extending from the box along one edge of the slot thereof. This has the drawback of a highly complex constitution without improving the attachment of the box to the tray.

Also known is Spanish Utility Model No. 8901175 concerning a flat bottomed box having feet for supporting it on the bottom wall of a tray and an aperture from one edge of which extend tab-like fold-down closing means. From the opposite edge there extend companion retaining means. Positioning tabs relative to one arrow head of a rib located in the bottom wall of the tray extend from the box bottom, while tabs for coupling with the other arrow head extend from said closing means for the attachment of the closing means to the retaining means. Attachment is achieved by a press fit in view of the smaller size of the aperture relative to the counterpart dimension of the closing means. Here the main drawback is the space occupied by the closing means and the lack of reliable attachment.

SUMMARY OF THE INVENTION

It is the object of the invention to overcome the drawbacks of the aforementioned embodiments. This object is achieved with a support member of the type mentioned at the beginning comprising: a slot means directed inwardly of the member from said base portion and defining an internal cavity capable of receiving said ribs having a first side wall provided with passages and a second side wall in which there is an aperture; a retaining member formed by: a connecting foot portion for attachment to the slot means; a fold-down tab defining at least one end locking finger; and a tooth facing away from said tab; said retaining member being movable between an inactive position, which it normally occupies, and an active position in which said tooth is inserted through said aperture and is capable of retentively engaging one of said free ends; fingers, each of which: (i) is opposite one of said passages; (ii) is attached to said base portion by a resilient connecting portion; and (iii) has a salient tooth inserted through a passage and which is capable of retentively engaging one of said free ends; and at least one resilient bridge extending on a higher plane above said base portion, facing an end locking finger, and which is capable of receiving this finger when said retaining member is in said active position.

BRIEF DESCRIPTION OF THE DRAWING

Further advantages and features of the invention will be appreciated from the following description in which there is disclosed without any limiting nature a preferred embodiment of the invention with reference to the accompanying drawings, in which:

FIG. 5 is a cross section view along the line V—V of FIG. 3.

FIG. 6 is a cross section view along the line VI—VI of FIG. 4.

FIG. 7 is a cross section view similar to that of FIG. 3, with the retaining member in the active position and a portion of the bottom wall of a tray also being shown.

DETAILED DESCRIPTION OF THE PREFERRED EMBODIMENT

A support member, such as a box 1 for housing an electrical type mechanism, is fitted within a tray 2 appropriate for containing conductor wires or cables.

Figure 1:
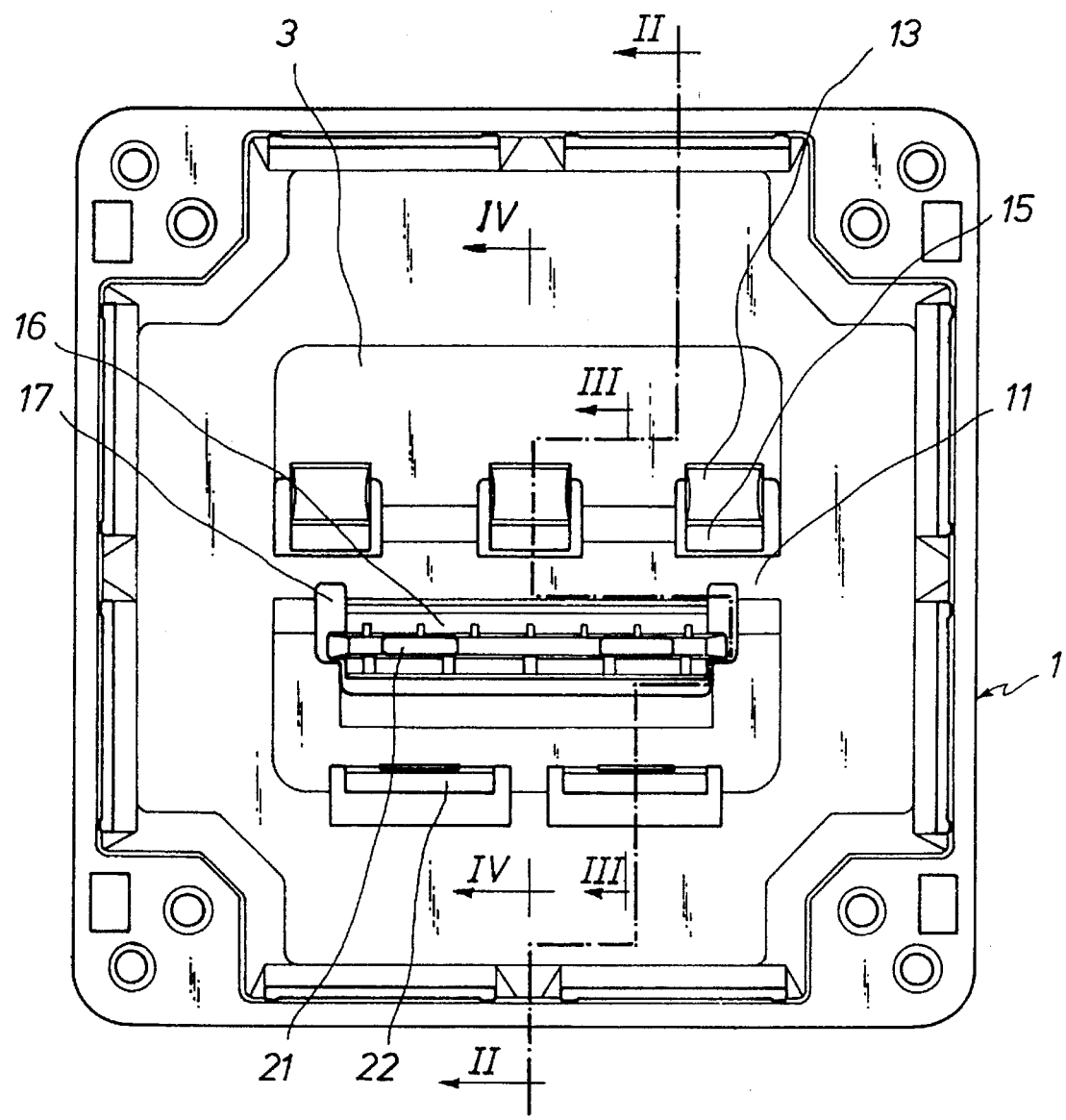
FIG. 1 is a plan view of a support member or box according to the invention.
Figure 2:
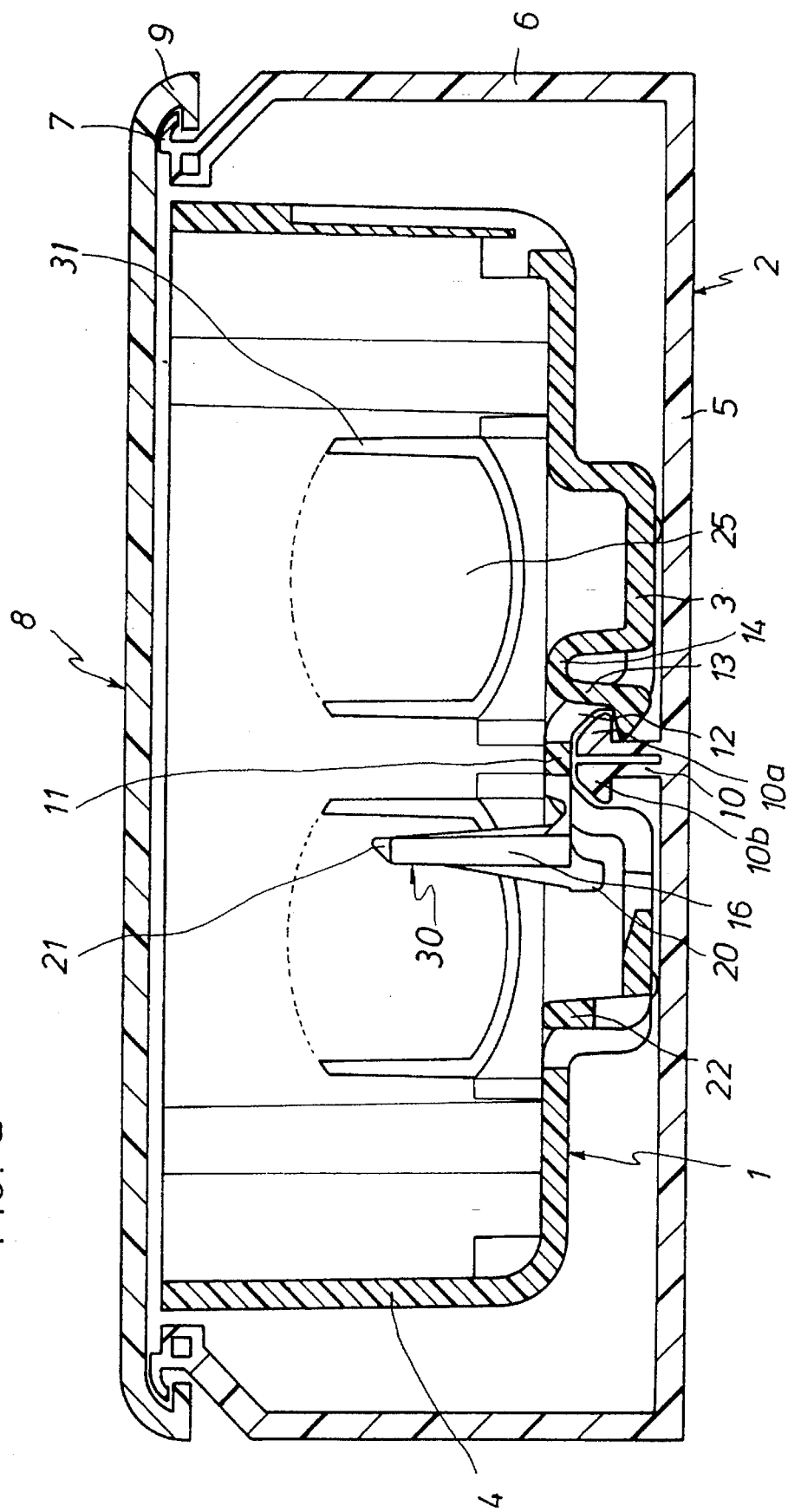
FIG. 2 is a cross section view of the box along the line II—II of FIG. 1, also being shown in cross section a tray in which the box is located.

The box 1 has a center base portion 3 which preferably, as shown, is on a lower plane than the rest of the box. It is also provided with side walls 4, the base portion 3 being the portion attached to the bottom wall 5 of the tray 2. The tray comprises longitudinal walls 6 having a rim 7 for attachment of a lid 8 having rims 9 mating with the rim 7. The tray 2 is conventional and is provided with one or more longitudinal ribs 10 having harpoon or arrowhead shaped free ends 10a and 10b. Such ribs 10 extend from the inner surface of the bottom wall 5, as shown in FIG. 2.

Figure 3:
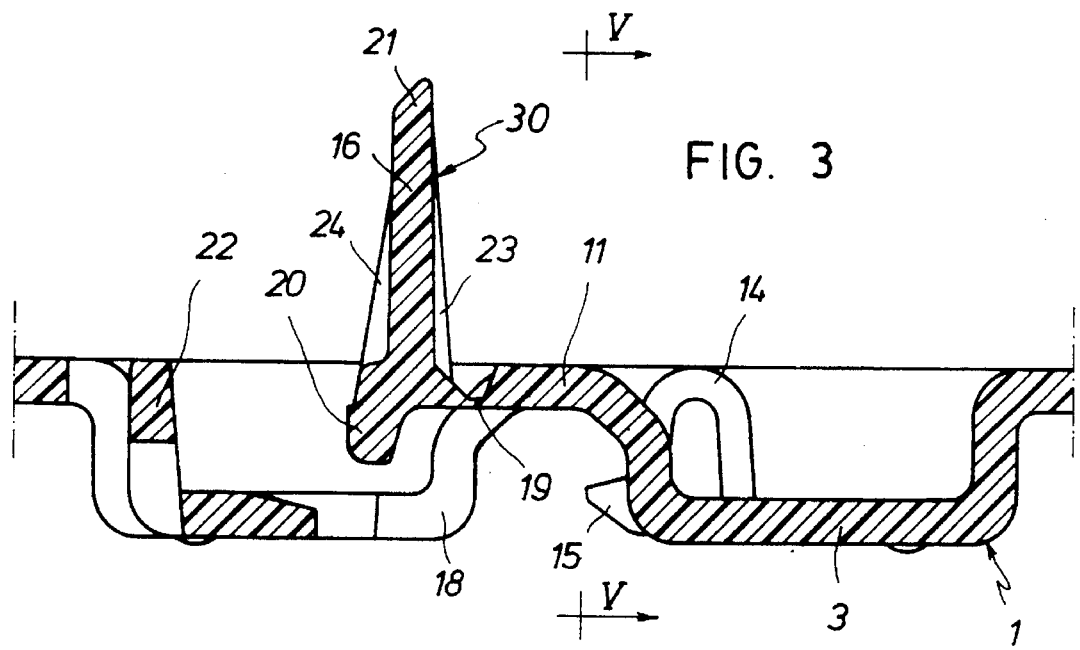
FIG. 3 is a cross section view along the line III—III of FIG. 1.
Figure 4:
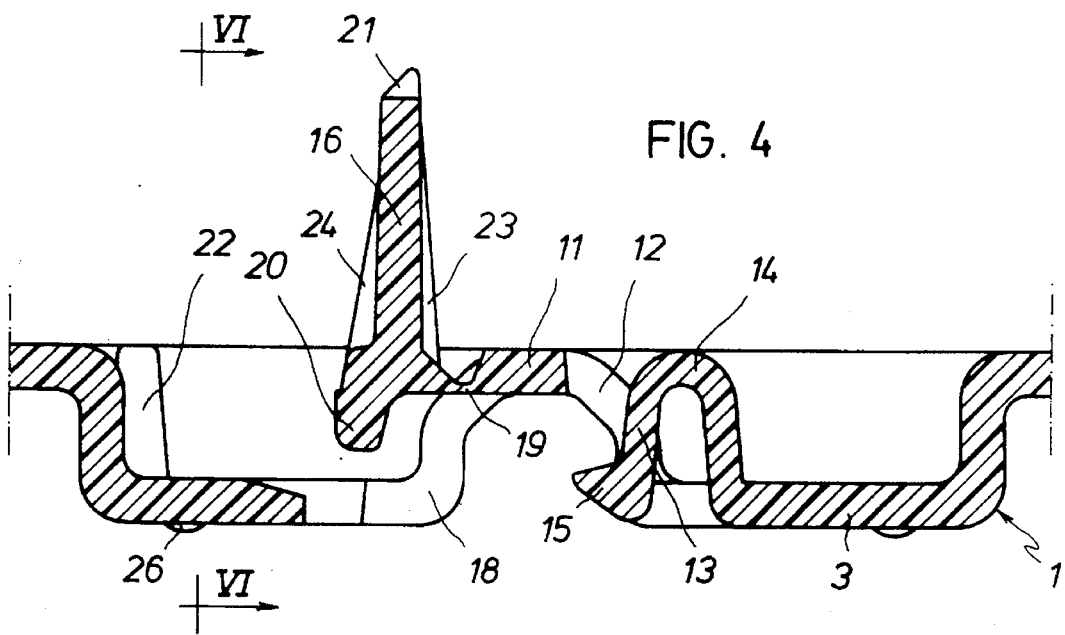
FIG. 4 is a cross section view along the line IV—IV of FIG. 1.

The support member or box 1 comprises a transverse slot means 11 directed inwardly of the member from the base portion 3 and which defines on the under side a cavity in which the ribs 10 can be received. A first side wall of the slot means 11 has passages 12 and in the second side wall opposite the first one there is an aperture 18. Fingers 13, attached to the base portion 3 by means of a resilient connecting portion 14 and facing the passages 12, are provided with a salient tooth 15 inserted through the corresponding passage 12, as may be seen in FIGS. 3 and 4, and which is capable of retentively engaging the free end 10a of a rib 10, when the box 1 is correctly located in a tray 2.

The box also comprises a retaining member 30 which is seen to have a foot portion 19 connecting it to the slot means and which is provided with a thin portion, to allow for the movement to be described hereinafter. On one side of the connecting foot portion 19 there is a fold-down tab 16, the side edges of which are bordered by apertures 17. On the free edge of the tab 16 there is at least one end locking finger 21. A tooth 20 extends away from the tab 16. The tab is preferably provided with reinforcement gussets 23 and 24.

The retaining member 30 is movable between an inactive position, shown in FIGS. 1–4 and 6, which is the normal position thereof, and an active position (FIG. 7). In the latter position the tooth 20 is inserted through the aperture 18 and retentively engages the free end 10b of a rib 10, when the box 1 is located in the tray 2.

In the proximity of the tab 16 and mating with each locking finger 21 there is a resilient bridge 22 on a higher plane than the base portion 3. When the retaining member 30 is in the active position, each locking finger 21 is inserted under the corresponding bridge 22 and this insertion is facilitated by the resilience of the bridge 22 and by the tapered shape of the locking fingers 21. The box 1 is conventionally provided with windows 31 partly covered by resilient covers 25, for the passage of electrical conductors from the tray 2.

The retaining member 30, in the inactive position thereof, maintains the tab 16 inactively upright. The retaining member 30 is moved to the active position thereof, i.e. coupling the box 1 inside the tray 2, as shown in FIG. 7. When the box 1 is inserted in the tray 2, a first step is carried out consisting of inserting the free ends 10a and 10b of the rib 10 of the tray 2 in the slot means 11, so that the tip 10a is inserted above the corresponding salient tooth 15, as may be seen in FIG. 2.

The second step, which completes the box fitting operation, is carried out by pushing the tab 16 until the locking fingers 21 thereof are inserted, thanks to the tapered edge thereof, under the bridge 22 which alone returns to the stable position thereof, thereby retaining the tab 16 and locking the rib on the tray 2.

The two operations for mounting and releasing the box 1 are easily achieved, simply moving respectively by hand the tab 16 and the bridge 22 which offer no resistance.

What I claim is:

1. An electrical mechanism support member applicable to a tray for electrical conductors, said tray having a bottom wall provided with a pair of longitudinal ribs, each having a harpoon-shaped free end, said support member having a base portion adapted to bear against said bottom wall, the support member comprising:

a slot means directed inwardly of the support member from the base portion and defining an internal cavity capable of receiving said ribs, said slot means including a first side wall having passages and a second side wall in which there is an aperture;

a retaining member formed by: a connecting foot portion for attachment to the slot means; a fold-down tab defining at least one end locking finger; and a tooth facing away from said end locking finger; said retaining member being movable between an inactive position, which it normally occupies, and an active position in which said tooth is inserted through said aperture and is capable of retentively engaging one of said free ends;

fingers, each of which: (i) is opposite one of said passages; (ii) is attached to said base portion by a resilient connecting portion; and (iii) has a salient tooth inserted through said one of said passages and which is capable of retentively engaging the other of said free ends; and at least one resilient bridge extending on a higher plane above said base portion, facing said at least one end locking finger, and which is capable of receiving said at least one end locking finger when said retaining member is in said active position.

2. The support member of claim 1, wherein said fold-down tab has reinforcement gussets.

3. The support member of claim 2 wherein said connecting foot portion has a thin portion.

* * * * *